G. E. NOYES.

Pug-Mills.

No. 5,823. Reissued April 7, 1874.

WITNESSES

Mary J. Utley.

Geo. E. Upham.

By

INVENTOR

George E. Noyes

Chipman & Souriss Co

ATTORNEYS.

AM. PHOTO-LITHOGRAPHIC Co. N. Y. (OSBORNE'S PROCESS.)

UNITED STATES PATENT OFFICE.

GEORGE E. NOYES, OF WASHINGTON, DISTRICT OF COLUMBIA, ASSIGNOR TO HIMSELF AND E. N. GRAY, OF SAME PLACE.

IMPROVEMENT IN PUG-MILLS.

Specification forming part of Letters Patent No. 95,374, dated September 28, 1869; reissue No. 5,823, dated April 7, 1874; application filed February 21, 1874.

*To all whom it may concern:*

Be it known that I, G. E. NOYES, of Washington, in the District of Columbia, have invented new and useful Improvements in Machines for Tempering Clay and other substances; and I do hereby declare that the following is a full, clear, and exact description thereof, reference being had to the annexed drawings making part of this specification, in which—

Figure 1:
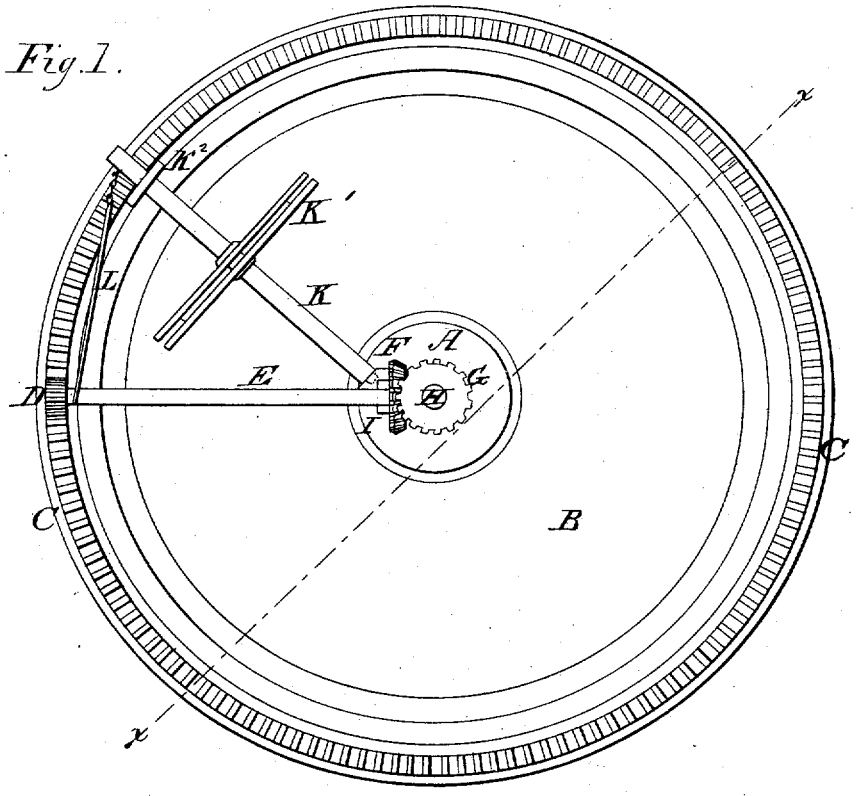
Figure 2:
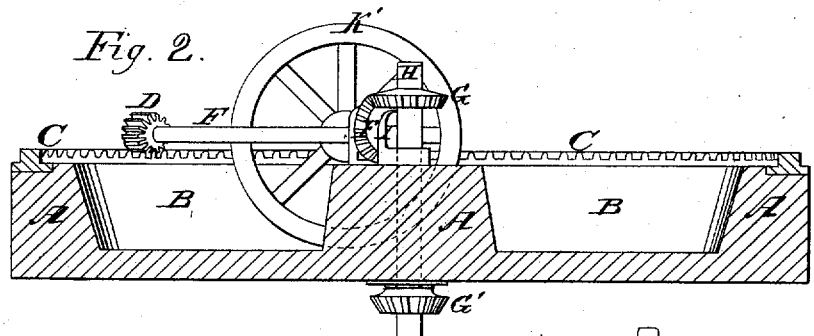
Figure 3:
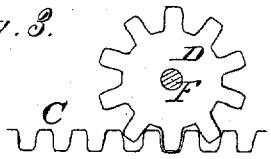
Figure 4:
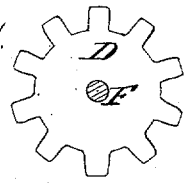

Figure 1 is a plan or top view of my improved machine, showing the receptacle for the clay or other substance to be tempered, the wheel for acting on such substance, and the gearing for driving this wheel. Fig. 2 is a vertical sectional elevation taken on line *x x* of Fig. 1, showing the arrangement of gearing for driving the tempering-wheel from below the bed or receptacle in which the material to be tempered is placed. Fig. 3 is an elevation of the pinion to be used in propelling the tempering-wheel, together with a portion of its circular rack, as they are usually constructed. Fig. 4 shows a pinion constructed according to my invention.

Corresponding parts in the drawings are designated by similar letters.

This invention has relation to machinery for tempering clay to be made into bricks and other objects. The novelty consists in the construction and arrangement of the gearing for actuating a tempering-wheel shaft which revolves loosely around a center driving-shaft, as will be hereinafter more fully set forth.

Serious difficulties have been encountered in constructing and operating machines of this class, from the fact that the power which has propelled them has been communicated through some horizontal shaft above the receptacle for the material to be tempered, which arrangement has necessitated the use of a long vertical shaft to communicate the motion of such horizontal shaft to the shaft and gear-wheels which propel the tempering-wheel. This arrangement of the parts has rendered necessary expensive, and in many cases inconvenient, frame-work to support the shafting, which often interfered with the efficient operating of the machine, and was always a large addition to its cost. Another and a very serious objection has arisen from the fact that the pinion which meshes into the circular rack upon the upper surface of the clay-receptacle has been constructed in accordance with well-known rules as to its diameter and the pitch-line of its teeth, which form of construction is found defective in this particular case.

It is the design of this invention to remedy the evils above alluded to, which result is accomplished in the following manner:

In the annexed drawings, A designates a receptacle for the material to be tempered, which receptacle may be made of any suitable material, and it should be of a circular form. This receptacle may be lowered into the earth to a point near the circular rack C upon its upper surface, which position will greatly facilitate the filling of the same; or it may be placed upon a foundation of any kind, and be elevated to any required height, to give ready access to the gearing upon the lower end of shaft H. The dimensions of this receptacle will vary according to circumstances; very good proportions for one for tempering clay for manufacturing into bricks being twenty feet in diameter by two feet deep. B represents the annular space formed in the receptacle, and C represents the gear, which is secured to the upper surface of the receptacle. This gear, which is annular, may be made in segments; or it may be cast entire, and any required pitch may be given to the teeth that will give them the required strength. D represents the pinion which meshes into the gear C, the usual method of construction of which pinion being represented by Fig. 3.

It has been found, however, that for this particular purpose a wheel so constructed is very defective, for the reason that it will not remain in gear with wheel C when propelling the tempering-wheel, for the reason that the contact-surface is only upon the front faces of the teeth of wheel C, or that surface which is in the direction of the motion of the pinion. This being the case, the tendency is to lift the pinion out of gear with wheel C, thus causing a stopping of the tempering-wheel, and endangering the breaking of the gearing. To remedy this defect, I construct the pinion D as shown in Fig. 4, the change consisting in adding to its diameter about one-half of an inch—when the diameter of the pinion is, say, ten inches—but retaining the same number of teeth, so that each tooth of the pinion, as it enters the space between the teeth of wheel C, shall reach so far forward as to come in contact with the rear faces of the teeth of such wheel, and thus be forced into such spaces instead of being lifted out, as in the former case. To effect this, it will be necessary to slightly reduce the size of the teeth in such pinion.

E represents a shaft, to the outer end of which the pinion D is secured, its opposite end resting in the bearing I, which is secured to the vertical shaft H. F represents a beveled spur-wheel, which is secured to the inner end of the shaft E, and meshes into, and is driven by, the wheel G, which is secured to the upper end of the shaft H, or to such portion thereof as to cause it to mesh with wheel E and drive the same. H represents a vertical shaft, which has its bearings in boxes secured to the center of the receptacle A, and which extends down through such receptacle for some distance, and has secured to its lower portion a wheel, G′, which meshes into any driving-wheel supplied for the purpose. I represents a box or bracket, the lower horizontal portion of which embraces the vertical shaft H and revolves thereon. The horizontal portion of this bracket extends outward from shaft H some distance, where it joins the vertical portion thereof, which vertical portion is provided with a slot in which the bevel-wheel F works, that portion of said bracket which is inside of this wheel serving as the support and bearing for the inner end of shaft E, while that portion thereof which is outside of said wheel has a slot formed in its upper end, through which the shaft E passes. To this outside portion there is to be secured a box or bearing for the inner end of shaft *k* to revolve in.

The arrangement of these parts is such that, as the vertical shaft H is revolved, the beveled gear-wheel G upon its upper end engages with and revolves the wheel F upon shaft E, which causes it to revolve upon its axis, and also to perform revolutions around such shaft, in which movement it carries with it the bracket I, the shaft K with its tempering-wheel $K^1$, and also a disk or wheel, $K^2$, which supports the outer end of shaft K.

K represents the shaft above alluded to, its inner end having its bearing in a box secured to the bracket I, while its outer end is supported by the wheel $K^2$, which rotates with such shaft upon a track formed on wheel C inside of the teeth of this wheel; or, if preferred, the track may be on the outside of the teeth of wheel C. The tempering-wheel $K^1$ is applied on its shaft K so as to revolve freely, and at the same time to receive movements in a direction with the length of this shaft. The endwise movements may be given to wheel $K^1$ by means of a rack and pinion, by means of a screw, or by any other suitable means. L represents a rod or chain, which is attached to the outer end of the shaft E, or to a point just inside the pinion D, from which point it extends to the outer end of the shaft K, to which it is secured. This rod or chain L is attached to the shaft E in such a manner that this shaft shall revolve freely therein, so that, as such shaft revolves, it shall, by acting on such rod or chain, draw after it the shaft K and the tempering-wheel $K^1$.

What I claim as new, and desire to secure by Letters Patent, is—

1. The combination, with a peripheral gear or annular rack, C, of a revolving propelling-shaft, E, which receives its rotation from a center driving-shaft, and which carries at its outer end the pinion D, attached thereto, engaging with said rack, substantially as and for the purpose specified.

2. The propelling-shaft E, having the pinion-wheel D keyed to its outer end, which wheel engages with the circular rack C, and receives its movements from a vertical center shaft, H, passed through the center of the bed A, through the medium of bevel-wheels G F, in combination with the tempering-wheel $K^1$ and revolving shaft K, substantially as and for the purposes set forth.

3. The bracket I, in combination with shafts E and K, and applied to revolve around the vertical shaft H with said shafts E and K, as and for the purposes set forth.

In testimony that I claim the above I have hereunto subscribed my name in the presence of two witnesses.

GEORGE E. NOYES.

Witnesses:
GEORGE E. UPHAM,
PHIL. C. MASI.